(12) United States Patent
Zacks et al.

(10) Patent No.: US 11,665,079 B1
(45) Date of Patent: May 30, 2023

(54) PROBE-TRIGGERED FULL DEVICE STATE CAPTURE, EXPORT, AND CORRELATION

(71) Applicant: Cisco Technology, Inc., San Jose, CA (US)

(72) Inventors: David John Zacks, Vancouver (CA); Carlos M. Pignataro, Cary, NC (US); Nagendra Kumar Nainar, Morrisville, NC (US); Hans F. Ashlock, Berkeley, CA (US); Thomas Szigeti, Vancouver (CA); Prapanch Ramamoorthy, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/744,853

(22) Filed: May 16, 2022

(51) Int. Cl.
  *G06F 15/173* (2006.01)
  *H04L 43/12* (2022.01)
  *H04L 43/06* (2022.01)

(52) U.S. Cl.
  CPC .............. *H04L 43/12* (2013.01); *H04L 43/06* (2013.01)

(58) Field of Classification Search
  CPC ................................ H04L 43/12; H04L 43/06
  USPC .................................................. 709/224–225
  See application file for complete search history.

(56) References Cited

U.S. PATENT DOCUMENTS

| | | | | |
|---|---|---|---|---|
| 7,606,887 | B1* | 10/2009 | Stewart | H04L 41/5003 709/224 |
| 11,012,305 | B2 | 5/2021 | Sividia et al. | |
| 2003/0110276 | A1 | 6/2003 | Riddle | |
| 2006/0190594 | A1* | 8/2006 | Jorgenson | H04L 43/50 709/224 |
| 2007/0280244 | A1* | 12/2007 | Kikuchi | H04L 45/00 370/252 |
| 2015/0003284 | A1 | 1/2015 | Gupta et al. | |
| 2015/0063256 | A1 | 3/2015 | Cherian et al. | |
| 2017/0053258 | A1* | 2/2017 | Carney | H04L 12/4633 |
| 2017/0093670 | A1* | 3/2017 | Dinan | H04L 67/1004 |
| 2017/0359344 | A1 | 12/2017 | Kaal et al. | |

(Continued)

OTHER PUBLICATIONS

ThousandEyes, "ThosandEyes Platform," retrieved from https://www.thousandeyes.com/product/platform, on Mar. 18, 2020, 12 pages.

(Continued)

*Primary Examiner* — Duyen M Doan
(74) *Attorney, Agent, or Firm* — Edell, Shapiro & Finnan, LLC

(57) ABSTRACT

A method comprising: at a management entity configured to communicate with a network: upon detecting a performance problem on a network path in the network, generating a trigger probe having a correlation identifier, the trigger probe configured to transit the network path and, on one or more designated network nodes of the network path, trigger (i) capturing a full device state, including a control plane state and a data plane state, and (ii) exporting a report of the full device state with the correlation identifier; sending the trigger probe along the network path; receiving, from each of the one or more designated network nodes, the report that includes the correlation identifier and the full device state; and correlating each report to the performance problem based on the correlation identifier in each report, to diagnose a root cause of the performance problem using the full device state in each report.

20 Claims, 9 Drawing Sheets

(56) References Cited

U.S. PATENT DOCUMENTS

| | | | |
|---|---|---|---|
| 2019/0053143 A1 | 2/2019 | Zhang et al. | |
| 2020/0344154 A1* | 10/2020 | Ying | H04L 41/5009 |
| 2022/0141131 A1* | 5/2022 | Rajamanickam | H04L 43/12 |
| | | | 370/252 |

OTHER PUBLICATIONS

ThousandEyes, "Network Device Monitoring," https://www.thousandeyes.com/resources/network-device-monitoring-product-brief, Jan. 2018, 2 pages.

* cited by examiner

550

552

```
IP INTERFACE BRIEF
IP-ADDRESS       OK? METHOD    STATUS                      PROTOCOL
19.1.1.3         YES  NVRM     UP                          UP
110.1.1.3        YES  NVRM     UP                          UP
UNASSIGNED       YES  NVRM     UP                          UP
UNASSIGNED       YES  NVRM     UP                          UP
30.1.1.3         YES  NVRM     UP                          UP
UNASSIGNED       YES  NVRM     UP ADMINISTRATIVELY DOWN    DOWN
1.2.3.4          YES  NVRM     UP                          UP
90.1.1.3         YES  NVRM     UP                          UP
UNASSIGNED       YES  NVRM     UP ADMINISTRATIVELY DOWN    DOWN
UNASSIGNED       YES  NVRM     UP ADMINISTRATIVELY DOWN    DOWN
UNASSIGNED       YES  NVRM     UP ADMINISTRATIVELY DOWN    DOWN
UNASSIGNED       YES  NVRM     UP ADMINISTRATIVELY DOWN    DOWN
UNASSIGNED       YES  NVRM     UP ADMINISTRATIVELY DOWN    DOWN
UNASSIGNED       YES  NVRM     UP ADMINISTRATIVELY DOWN    DOWN
UNASSIGNED       YES  NVRM     UP ADMINISTRATIVELY DOWN    DOWN
UNASSIGNED       YES  NVRM     UP ADMINISTRATIVELY DOWN    DOWN
1.1.1.3          YES  NVRM     UP                          UP
16.16.16.16      YES  NVRM     UP                          UP
17.17.17.17      YES  NVRM     UP                          UP
16.16.16.17      YES  NVRM     UP                          UP
18.18.18.18      YES  NVRM     UP                          UP
19.19.19.19      YES  NVRM     UP                          UP
1.1.1.3          YES  NVRM     UP                          UP
```

554

```
IP OSPF NEIGHBOR

PRI  STATE       DEAD TIME     ADDRESS       INTERFACE

0    FULL        0:00:39       30.1.1.4      ETHERNET1/0
0    FULL        0:00:39       110.1.1.4     ETHERNET1/0
0    FULL        0:00:39       19.1.1.6      ETHERNET1/0
```

PROBE-TRIGGERED FULL DEVICE STATE CAPTURE, EXPORT, AND CORRELATION

TECHNICAL FIELD

The present disclosure relates to networking monitoring and troubleshooting.

BACKGROUND

Synthetic network probes can be used to gauge network performance, as an important component within a full stack observability (FSO) solution. Such probes are valuable not only to spot issues along a network path, but also to reveal network nodes on which issues are occurring. However, the underlying causes of any observed network impairments, such as network node buffer congestion, device central process unit (CPU) loading, packet drops, routing loops, or other pathological conditions, may not be readily apparent. This poses a significant challenge to network and application administrators because it is not evident which data should be gathered from the network nodes to identify and remediate the issues. In addition, some issues are intermittent in nature, which makes determining their root causes (referred to as "root-causing") even more difficult.

BRIEF DESCRIPTION OF THE DRAWINGS

FIG. 5B is a listing of control plane state information captured from a network node, according to an example embodiment.

DESCRIPTION OF EXAMPLE EMBODIMENTS

Overview

Figure 1:
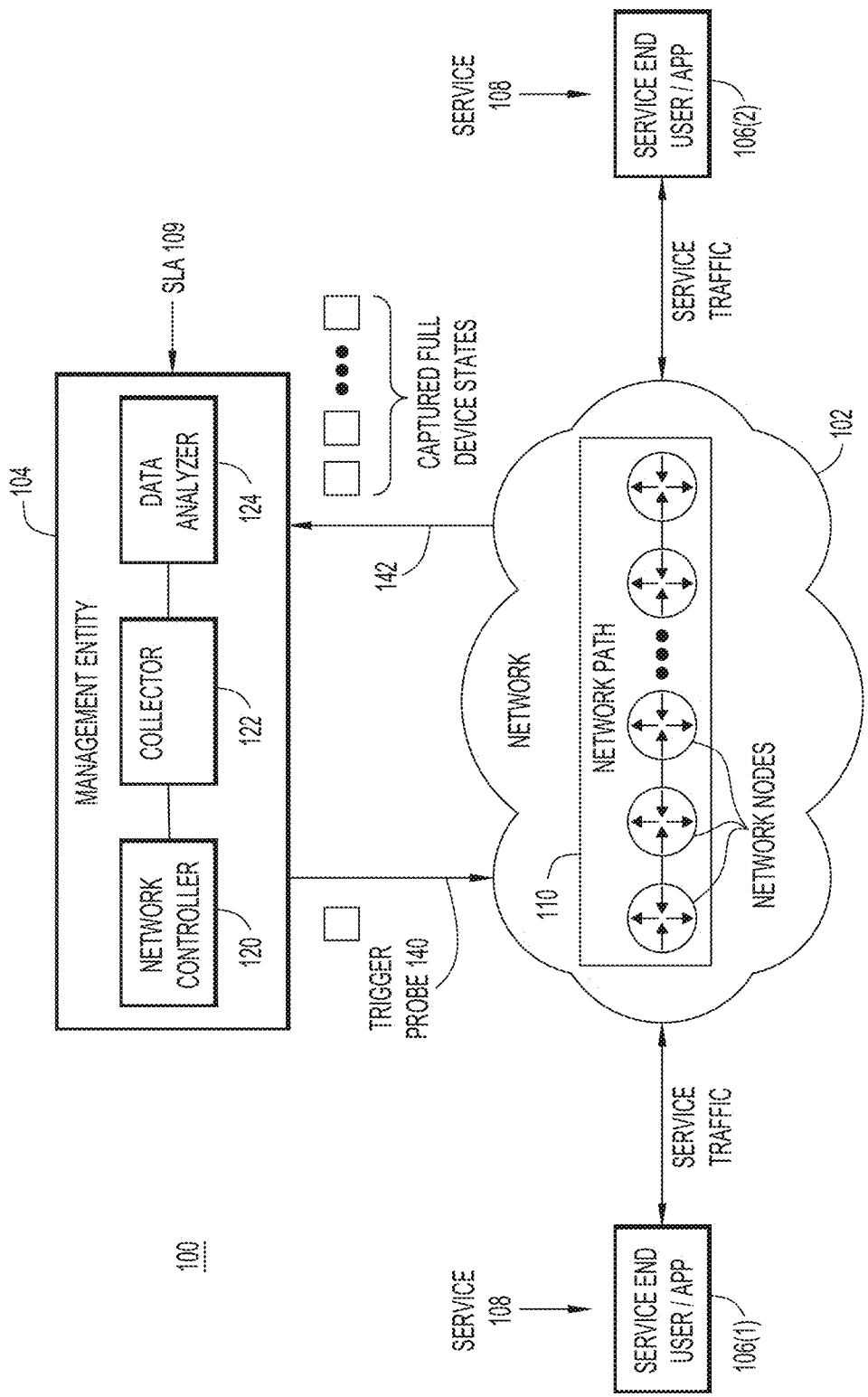
FIG. 1 is a block diagram of a network environment in which embodiments directed to probe-triggered full device state capture, export, and correlation may be implemented, accordance to an example embodiment.

In an embodiment, a method comprises: at a management entity configured to communicate with a network: upon detecting a performance problem on a network path in the network, generating a trigger probe having a correlation identifier correlated to the performance problem, the trigger probe configured to transit the network path and, on one or more designated network nodes of the network path, trigger (i) capturing a full device state, including a control plane state and a data plane state, and (ii) exporting a report of the full device state with the correlation identifier; sending the trigger probe along the network path; receiving, from each of the one or more designated network nodes transited by the trigger probe, the report that includes the correlation identifier and the full device state; and correlating each report to the performance problem based on the correlation identifier in each report, to diagnose a root cause of the performance problem using the full device state in each report.

Example Embodiments

Embodiments presented herein are directed to probe-triggered full device state capture, export, and correlation. The embodiments provide network trigger probes configured to trigger a full core memory dump from any designated network node along an end-to-end network path traversed by the trigger probes, along with unique correlation identifiers for the trigger probes that can be used to associate or correlate the trigger probes to the full core memory dumps so triggered and captured. A captured full core memory dump for a network node represents a "frozen-in-time" full device state, including data and control plane states, of the network node that can then be used to aid in root cause identification/troubleshooting of problems along the network path, leading to rapid network problem resolution.

The embodiments further provide instantiation of virtual instances of the network nodes based on their respectively captured full device states, and troubleshooting (e.g., diagnosing a root cause of) a network path performance problem using the virtual instances. The virtual instances allow for subsequent replay of an exact network state that may have led to the performance problem. Armed with these capabilities, a network administrator can capture a full device state of a network node of interest (or full device states of multiple network nodes of interest), "log into" that frozen-in-time snapshot of the full device state at a later time, with the ability to execute "show" and other commands against that full device state for purposes of gauging how the network node of interest was operating at the point in time where the full device state was captured based on the full core memory dump.

Using the "frozen-in-time" full device state, the network administrator can determine if observed traffic impairments may have been caused by particular pathological conditions on the network node of interest, such as high CPU utilization, buffer exhaustion, congestion, forwarding/routing protocol issues, and so on. Once this root cause determination is made, a plan can then be formulated by the network administrator to address the issue, as appropriate.

With reference to FIG. 1, there is a block diagram of a network environment 100 in which the embodiments directed to probe-triggered full device state capture, export, and correlation may be implemented. Network environment 100 includes a communication network 102, a management entity 104 connected to and configured to communicate with the communication network, and end user devices and/or applications (apps) 106(1) and 106(2) associated with a service 108 defined in a service level agreement (SLA) 109 and implemented over the communication network. Communication network 102 may include one or more wide area networks (WANs), such as the Internet, and one or more local area networks (LANs). End user devices/applications 106(1) and 106(2) exchange service traffic (e.g., data packets, such as Internet Protocol (IP) packets) associated with service 108 over a network path 110 configured in communication network 102. Network path 110 includes a sequence of network nodes configured to forward the service traffic between end-user devices/applications 106(1) and 106(2), as described below in connection with FIG. 2.

Management entity 104 includes a network controller 120 to configure and control network path 110, a collector 122 to collect information reported or exported from the network path, and a data analyzer 124 to analyze the collected information. In an example, network controller 120, collector 122, and data analyzer 124 may be implemented as co-located applications or services hosted on servers of a data center or may be distributed geographically across multiple data centers. Management entity 104 also receives SLA 109, which defines service level performance for service 108 (and thus of network path 110) in terms of an expected or acceptable performance profile for the service.

In accordance with the embodiments presented herein, management entity 104 monitors the performance of network path 110 against the acceptable performance profile for service 108. When the monitoring indicates/detects an out-of-profile condition on network path 110, management entity 104 automatically sends a specially configured performance or "trigger probe" (TP) 140, encoded with a correlation identifier (ID) that is unique to that trigger probe and that is correlated to the out-of-profile condition, along network path 110. Alternatively, the network administrator can manually initiate sending of trigger probe 140 along network path 110. Trigger probe 140 is configured to trigger only selected/particular (i.e., specifically identified or designated) network nodes along network path 110 to (i) capture their respective full device states, and (ii) export to a designated export location (e.g., collector 122) reports 142 that include the captured full device states along with the correlation ID. Data analyzer 124 retrieves the reports (with their captured full device states and correlation ID) and correlates them to each other and to the out-of-profile condition based on the correlation ID in the reports. Data analyzer 124 and/or a network administrator use the correlated information to troubleshoot the out-of-profile condition.

Figure 2:
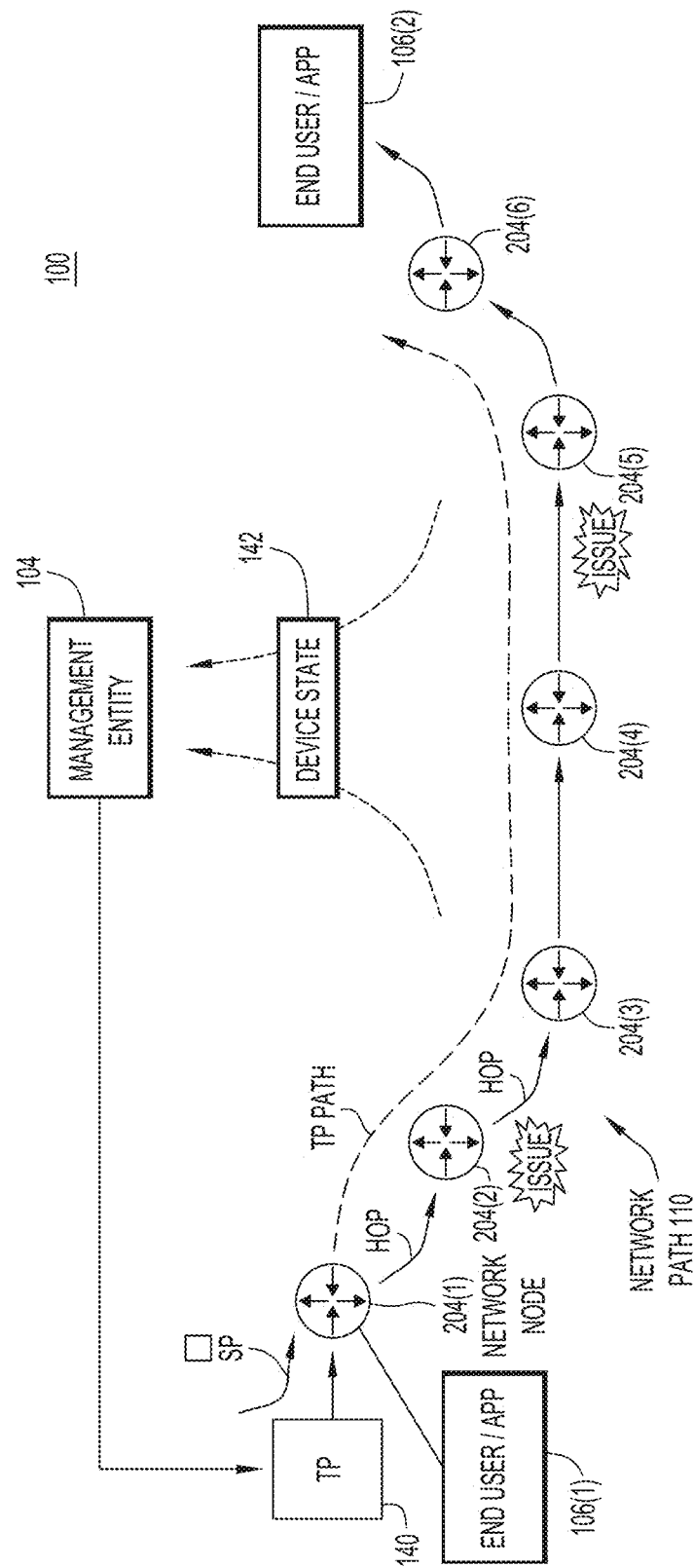
FIG. 2 is an illustration of a network path of the network environment, according to an example embodiment.

The embodiments are described in further detail with reference to FIGS. 2 and 3. FIG. 2 is an illustration of an example of network path 110. In the example, network path 110 includes a sequence of network devices or nodes 204(1)-204(6) configured to forward the service traffic between end users/applications 106(1) and 106(2). Network nodes 204(1) and 204(6) are end nodes (e.g., end-to-end source and destination nodes) of network path 110. Network nodes 204(1)-204(6) may include routers and/or switches that are implemented as physical devices, or virtual devices hosted on a server, for example. Network nodes 204(1)-204(6) are configured to forward/route data packets in accordance with known or hereafter developed communication protocols, including, but not limited to, the IP and transmission control protocol (TCP) suite of protocols.

Forwarding/routing of data packets along network path 110 by each network node 204(1)-204(6) is governed by a full device state of the network node. The full device state includes all information for a control plane (CP) state and a data plane (DP) state, including dependency information, such as internal registry, performance counters, and so on, used by network and link layer communication protocols implemented on network node 204(1)-204(6) for routing and forwarding of the data packets along network path 110. Examples of such communication protocols include, but are not limited to, Routing Information Protocol (RIP), Interior Gateway Protocol (IGRP), Open Shortest Path First (OSPF), Exterior Gateway Protocol (EGP), Enhanced Interior Gateway Routing Protocol (EIGRP), Border Gateway Protocol (BGP), Intermediate System-to-Intermediate System (IS-IS), Synchronous Data Link Protocol (SDLC), High Level Data Link Protocol (HDLC), Serial Line Interface Protocol (SLIP), Point to Point Protocol (PPP), Link Control Protocol (LCP), Link Access Procedure (LAP), Network Control Protocol (NCP), and so on.

The control plane state includes current routing tables (including the routing information base (RIB)), media access control (MAC) addresses, IP addresses (e.g., IP version (v) 4 (IPv4) addresses and/or IPv6 addresses), interfaces and their performance counters (e.g., counts of dropped packets, jitter measurements, latency measurements, and so on), discovery information (e.g., information discovered using BGP), and so on. The data plane state includes current forwarding information tables (including the forwarding information base (FIB)), forwarding policies (e.g., quality-of-service (QoS)), and so on. The control plane state and/or the data plane state may also include protocol tunnel information, such as indicators for whether a protocol tunnel is supported/present and, if so, the type of protocol tunnel (e.g., generic routing encapsulation (GRE), virtual private network (VPN), and IP security (IPSEC)), as well as encapsulation attributes for the protocol tunnel (e.g., for GRE, values from the GRE header).

Figure 3:
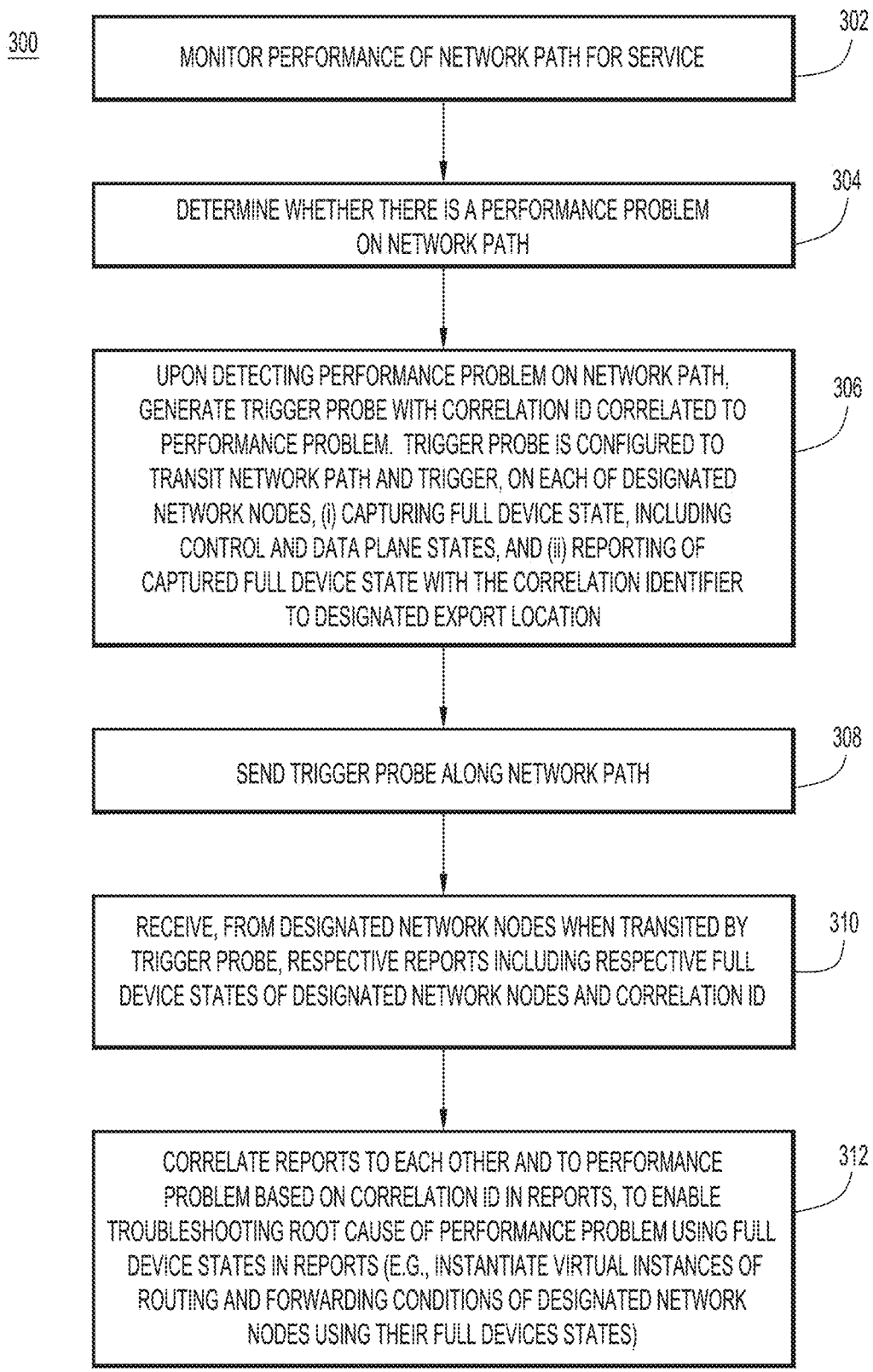
FIG. 3 is a flowchart of a method of performing probe-triggered full device state capture, export, and correlation in connection with the network path, according to an example embodiment.

FIG. 3 is a flowchart of an example method 300 of performing probe-triggered full device state capture, export, and correlation in connection with network path 110. Method 300 is described also with continued reference to FIGS. 1 and 2. Method 300 assumes SLA 109 defines an acceptable performance profile for service 108. The acceptable performance profile prescribes acceptable ranges for various service and network performance conditions or parameters, such as end-to-end (network path) packet delay, packet drop rate at each hop (e.g., at each network node), packet jitter at each hop, packet latency at each hop, and so on. When measured values for the various performance conditions are within their prescribed ranges, service 108 is considered to be operating "in profile." On the other hand, when the measured values are not within their prescribed limits (e.g., are one or more standard deviations away from mean performance values, over a defined time interval), service 108 (and network path 110) is considered to be operating "out-of-profile." An out-of-profile condition indicates network path 110 may be experiencing a problem.

At 302, management entity 104 monitors the performance of service 108, i.e., management entity 104 measures the various performance conditions for service 108 along network path 110. To do this, management entity 104 (e.g., network controller 120) may inject periodic synthetic probes SP (shown in FIG. 2) along network path 110. As synthetic probes SP traverse network path 110, they (i) collect network path topology information, such as IP addresses of network nodes 204(1)-204(6) transited by the periodic probes, and (ii) measure the various performance conditions on the network path. Synthetic probes SP return the collected hop-by-hop topology information and performance measurements to management entity 104 (e.g., to network controller 120). Management entity 104 may employ other known or hereafter developed techniques to collect/determine the topology information for network path 110.

At 304, management entity 104 compares the performance measurements against their acceptable ranges as defined in SLA 109, to determine whether service 108/network path 110 is operating out-of-profile. In this way, management entity 104 determines whether there is a problem on network path 110 that is negatively impacting service performance, based on the monitoring and the acceptable performance profile of SLA 109. In the example of FIG. 2, the monitoring detects an out-of-profile condition ("issue") associated to network nodes 204(2) and 204(4) (or 204(5)).

Upon determining/detecting an out-of-profile condition indicative of a performance problem on network path 110 (i.e., upon detecting the performance problem), at 306, management entity 104 performs the following operations. Assuming that the network path topology information is known to network controller 120 a priori based on operation 304, management entity 104 accesses the network path topology information (e.g., the hop-by-hop IP addresses of all of network nodes 204(1)-204(6)) for network path 110. If the network topology information is not readily available, management entity 104 may initiate sending of additional synthetic probes along network path 110 to trace the network path hop-by-hop, and to report results of the trace (e.g., a sequence of hop-by-hop IP addresses) to the management entity. Based on hop-by-hop performance measurements exposed by synthetic probes SP, management entity 104 may identify/select one or more designated/particular network nodes of interest (e.g., network nodes 204(2) and 204(4)) among network nodes 204(1)-204(6).

Management entity 104 generates a unique correlation ID and links/associates the correlation ID to the out-of-profile condition detected at 304. For example, management entity 104 stores the correlation ID in a mapping table that maps the correlation ID to an identifiable descriptor of the out-of-profile condition. As used herein, the terms "correlate," "link," "associate," "map," and "tie together" may be considered synonymous and used interchangeably. Armed with the correlation ID, the network path topology information, and identities of the one or more designated network nodes of interest, management entity 104 generate/creates trigger probe 140 encoded with the correlation ID. Management entity 104 configures trigger probe 140 to transit network path 110 end-to-end (i.e., to transit all of network nodes 204(1)-204(6)) and to trigger, on each of the one or more designated network nodes of interest (and only those nodes):
  a. Capturing a full device state by performing a core memory dump into local memory.
  b. Reporting/exporting the captured full device state, with the correlation ID, to a designated export entity (e.g., to an export location, such as collector 122).

Management entity 104 may also configure trigger probe 140 with a time-to-live (TTL) value of one less than a full/end-to-end TTL for network path 110, to avoid forwarding of the trigger probe beyond end nodes 204(6) and 204(1), and thus avoid confusing end user devices/applications 106(1) and 106(2) that might otherwise receive the trigger probe. The term "TTL" is construed broadly to also encompass "hop limit" (HL) as used in IPv6.

At 308, management entity 104 sends trigger probe 140 along network path 110 end-to-end (along a path shown in dashed line in FIG. 2). Therefore, trigger probe 140 traverses each of network nodes 204(1)-204(6). As trigger probe 140 transits network path 110, the trigger probe triggers each of the one or more designated network nodes to capture its full device state and export the captured full device state (shown at 142 in FIG. 2) to the export location. For example, each designated network node sends to collector 122, a report formatted as a data packet that includes the captured full device state and the correlation ID as copied from the trigger probe.

For each designated network node, the captured full device state includes a snapshot at a specific time (i.e., the "frozen-in-time" snapshot) of all control plane state and data plane state information, as described above. The frozen-in-time full device state is sufficient to instantiate a virtual instance of the routing and forwarding configuration and operation of the network node, offline, using any known or hereafter developed network node emulator, as described below by way of example in connection with FIG. 7.

At 310, management entity 104 (e.g., collector 122) receives and stores the one or more reports sent by corresponding ones of the designated network nodes.

At 312, management entity 104 (e.g., data analyzer 124) associates/correlates the captured full device states in the reports to each other (assuming multiple reports from multiple designated network nodes), and to the out-of-profile condition, based on the common correlation ID in the reports, to produce correlated information, i.e., a set of correlated captured full device states. Later, the network administrator may log into a user portal of management entity 104 (e.g., data analyzer 124), and troubleshoot the out-of-profile condition using the correlated information in order to diagnose a root cause of the problem/condition.

Method 300 may be repeated over time to generate multiple trigger probes, each with a distinct correlation ID, in order to assist in diagnosing the observed issue (e.g., the out-of-scope condition).

Figure 4:
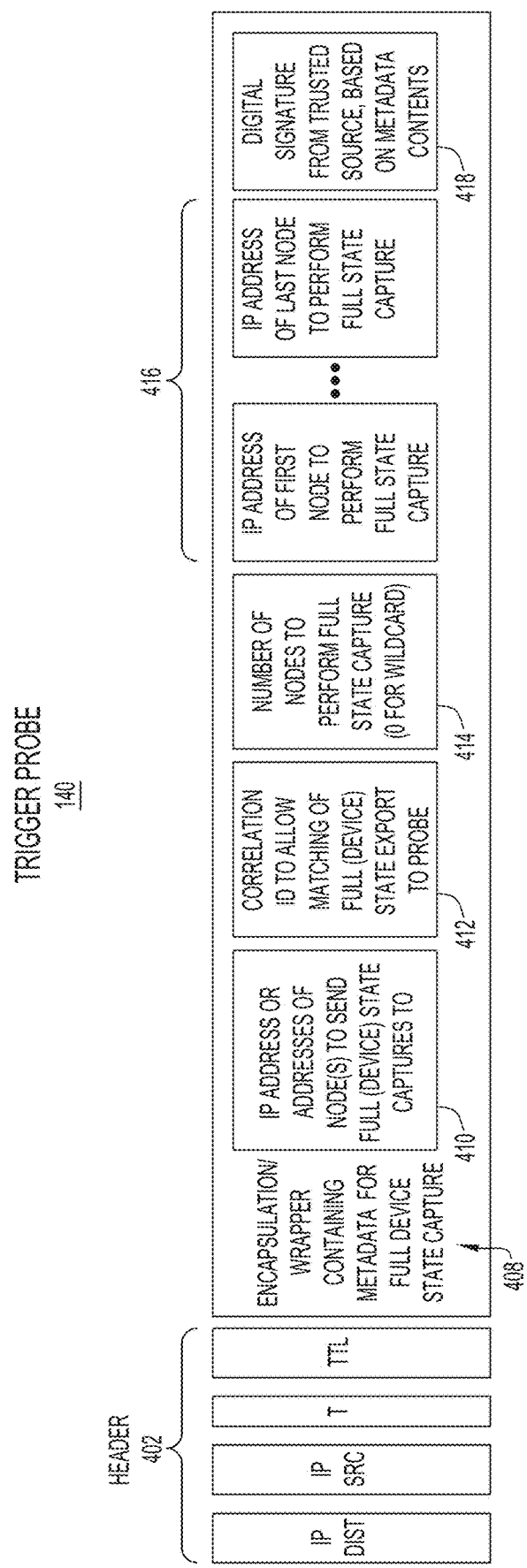
FIG. 4 is an illustration of a format for a trigger probe, according to an example embodiment.

With reference to FIG. 4, there is an illustration of an example format/fields for trigger probe 140. Trigger probe 140 is formatted as a specialized IP packet that includes a modified IP header 402. Modified IP header 402 includes a 5-tuple with an IP source (SRC) address (e.g., for network device 204(1) or management entity 104), an IP destination (DST) address (e.g., for network device 204(6)), a protocol identifier, a source port identifier, and a destination port identifier (not specifically shown in FIG. 4). The 5-tuple establishes the end-to-end source and destination IP addresses for the network path. The 5-tuple may be the same 5-tuple as used by synthetic probes SP described above, so that trigger probe 140 follows the same network path as the synthetic probes. This ensures that full device state capture is initiated on the designated network nodes on which an initial issue may have been revealed by synthetic probes SP. Modified IP header 402 may also include (i) a type field T populated with a value or flag that indicates that the IP packet is either a trigger probe or is not a trigger probe, and (ii) a TTL field populated with a TTL value that is one less than an actual measured path TTL for the network path, for the reasons described above.

Trigger probe 140 also includes metadata wrapper or encapsulation 408 to encapsulate metadata for capturing the full device state on the one or more designated network nodes. Metadata wrapper 408 may be formatted in accordance with the virtual extensible (VX) LAN (VXLAN)-generic protocol extension (GPE) (VXLAN-GPE) protocol, the network service header (NSH) protocol, or the hypertext transfer protocol (HTTP), for example.

The metadata includes the following fields:
  a. Field 410: IP addresses of one or more network devices/nodes (e.g., collector 122) to which full device state captures triggered by the trigger probe is/are to be exported/forwarded.
  b. Field 412: A correlation ID that associates/ties the captured full device state to the trigger probe and a detected out-of-profile condition. The correlation ID may be an 8-bit numeric value, for example.

c. Field 414: A number of nodes that are to perform the full device state capture. The number may be 0 when a wildcard is used (see trigger field 416, described next).

d. Field 416 (trigger field): Identifier(s) of the one or more designated network nodes that are to initiate full device state capture when traversed by the trigger probe 140. Each identifier may be a physical or logical IP address of a designated network node. Trigger field 416 may alternatively include a wildcard designator (e.g., an IPv4 address 0.0.0.0) that will trigger the capture of a full device state on any capable network node that recognizes the wildcard designator.

e. Field 418: A digital signature from a trusted source. The trigger probe is digitally signed by the trusted source in order to avoid spoofing/denial of service (DoS) attack vectors, and to improve overall solution security. The digital signature is based on contents of the trigger probe. For example, the digital signature may be computed (e.g., as a hash) over the encapsulated metadata, and may be verified by each receiver (e.g., network node) that receives the trigger probe along the network path. This verifies both that the trigger probe originated from a trusted source, and that the encapsulated metadata has not been tampered with in transit. If additional security is desired for the trigger probe (e.g., if it is considered desirable to mask the metadata as to full-state-capture export destinations or devices from prying eyes), the metadata may also be encrypted.

Figure 5A:
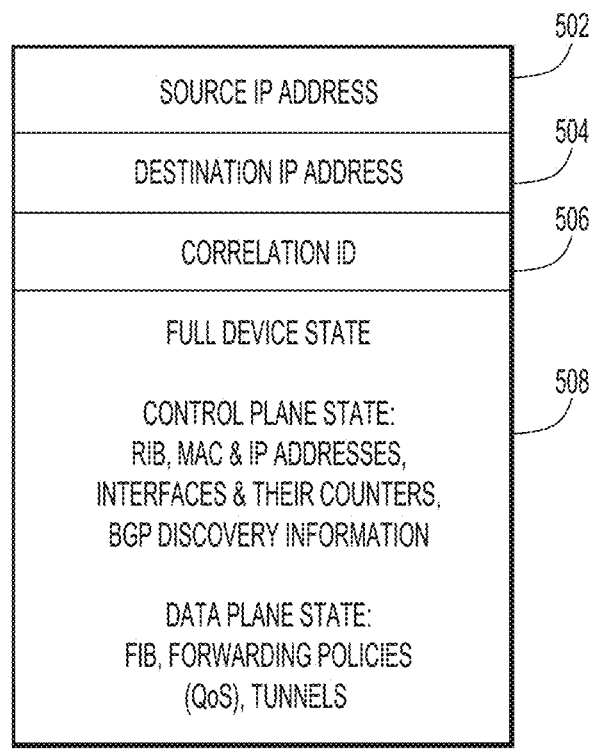
FIG. 5A is an illustration of a report of captured full device state information triggered by a trigger probe, according to an example embodiment.

With reference to FIG. 5A, there is an illustration of an example report 500 triggered by a trigger probe. Report 500 may be formatted as an IP packet including a source IP address 502 of a designated network node that originates the report, a destination IP address 504 corresponding to where to export the report (i.e., an export location), a correlation ID 506, and captured full device state information 508. Full device state information 508 includes all control plane state information and data plane state information as described above.

With reference to FIG. 5B, there is an example listing of control plane state information 550 captured from a designated one of network nodes 204(1)-204(6). Control plane state information 550 includes a listing of status 552 for IP interfaces configured on the network node. Each row corresponds to an interface and includes fields or columns for the IP address and various status indicators corresponding to the interface. Control plane state information 550 also includes neighbor information 554 for OSPF protocol running on the network node. The neighbor information includes a priority, state, dead time on a given interface (i.e., time since last use), IP address, and interface identifier.

Figure 6:
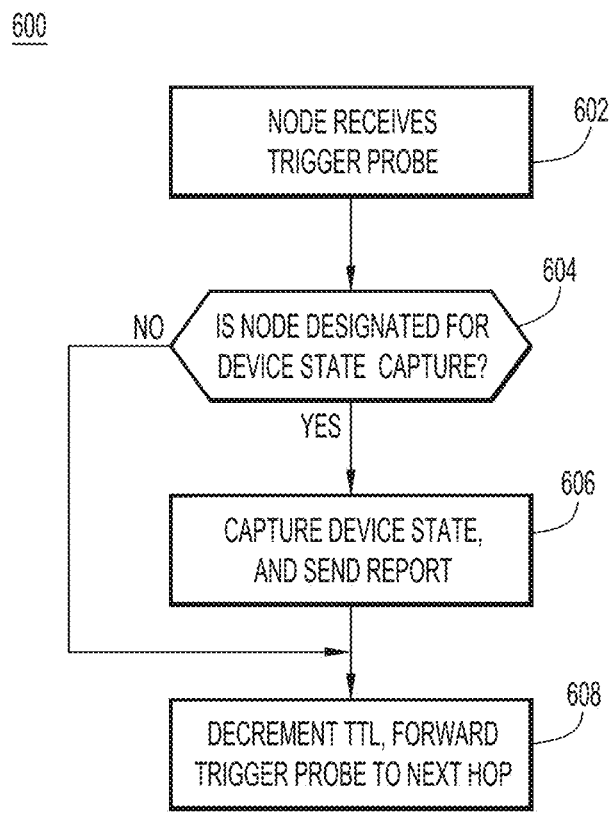
FIG. 6 is a flowchart of a method performed by a network node when traversed by a trigger probe, according to an example embodiment.

With reference to FIG. 6, there is a flowchart of an example method 600 performed by each network node (e.g., 204(i)) when traversed by a trigger probe (e.g., 140). Each network node traversed by the trigger probe is referred to as a "transit node."

At 602, the network node receives an IP packet configured as a trigger probe, parses/accesses the fields of the trigger probe and, based on values in the fields, determines that the type field T indicates that the IP packet is a trigger probe. Flow proceeds to 604. In the event that the network node does not recognize the IP packet as the trigger probe, the network device simply forwards the IP packet to the next hop.

Upon determining the IP packet is the trigger probe, and upon verifying the digital signature in the trigger probe, at 604, the network node determines whether its IP address matches an identifier (e.g., an IP address) in the trigger field of the trigger probe (i.e., whether the network node is designated for full device state capture). If yes, flow proceeds to 606. If no, flow proceeds to 608.

At 606, the network node performs a core memory dump to local memory. The core memory dump includes the full device state of the network node. The core memory dump may include more than the full device state, such as CPU usage, memory usage, CPU instructions currently being executed, and so on. The network node creates a report and copies the core memory dump from local memory to the report. The network node further populates the report with the correlation ID as copied from the trigger probe, a source IP address set to the IP address of the network node, and a destination IP address copied from the export location field (410) of the trigger probe. The network node forwards the report to the export location.

Since generation and export of the full device state capture may consume resources (e.g., memory, CPU, network bandwidth, etc.) on the network node, the network node may operate a locally-instantiated (and possibly centrally-configured) policy limiting the number and frequency of such full device state capture and export activity, in order to limit either unintentional or malicious use of the full device state capture and export facility. In addition, the network node may optionally choose to encrypt the full device state capture data prior to export, should this be desired (for example, this may be appropriate if concerns exist about the possible interception of the captured full device state in transit). Even further, the network device may optionally digitally sign the captured full device state capture prior to export, such that the receiver (export location) can verify that the data has not been tampered with in transit and originates from a known and trusted source.

Flow proceeds from 606 to 608, where the network node decrements the TTL value in the trigger probe, and forwards it to the next hop along a network path defined in part by the header of the trigger probe.

Figure 7:
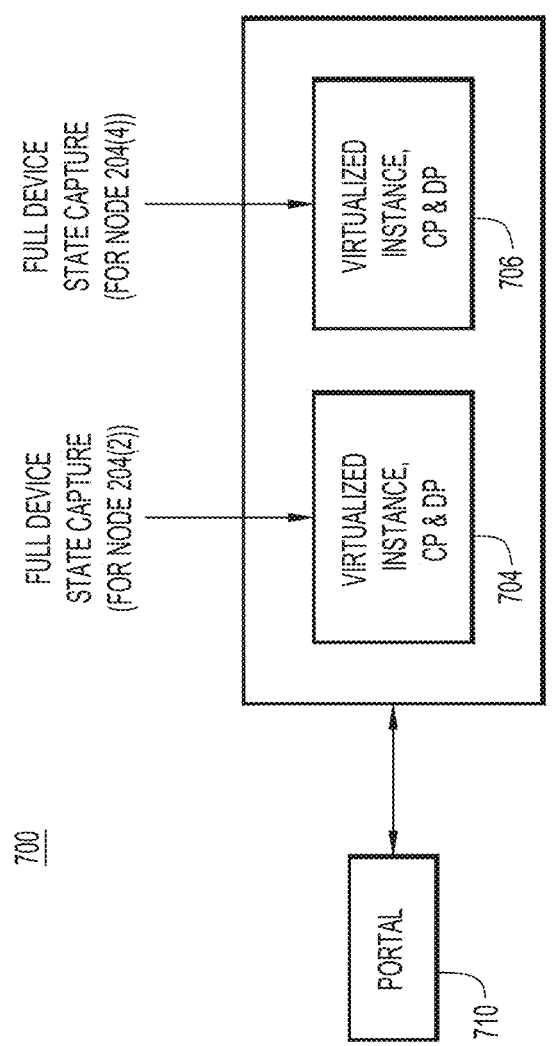
FIG. 7 is a block diagram of an analysis framework generated from full device state captures, according to an example embodiment.

With reference to FIG. 7, there is a block diagram of an example analysis framework or network node emulator 700 generated by data analyzer 124 based on full device state captures from network path 110, triggered by trigger probe 140. The example of FIG. 7 assumes that trigger probe 140 triggered full device state captures of network node 204(2) and network node 204(4). The full device state captures populate analysis framework 700. More specifically, analysis framework 700 instantiates virtual/virtualized instances 704, 706 of distinct routing and forwarding configurations of network nodes 204(2), 204(4) using their full device state captures, respectively. In other words, analysis framework 700 emulates forwarding and routing features of network nodes 204(2), 204(4). Analysis framework 700 includes an administrative portal 710 that presents a graphical user interface (GUI) through which an administrator can interact with, and thus troubleshoot, virtualized instances 704, 706 more or less as if they were the actual control and data planes of the corresponding network nodes 204(2), 204(2). Through the GUI, the administrator may operate, monitor, and edit virtualized instances 704, 706. In this way, the virtualized instances are fully interactive and able to be queried or inspected.

Additional use cases, trigger conditions, and capabilities are now described. In addition to using an issue observed via a synthetic probe to initiate sending a trigger probe, an option exists to leverage issues spotted at other levels within an application stack as a possible initiator for sending the trigger probe to trigger full device state capture. As an example, an issue may be observed in a business transaction within an application performance monitoring (APM) solution. Specifically, when an issue is observed, such as a service level objective (SLO) violation for a given business transaction, the client IP address may be passed to a network controller (e.g., a Cisco digital network architecture (DNA) center), which could then decide to execute a variety of possible actions, including:
  a. Sending both a synthetic probe as well as the trigger probe, from a location as close as possible to an observed client location, in order to further troubleshoot the observed issue from both a network as well as an application perspective. In such a case, the correlation ID would also correspond to the application associated data, in order to allow all three data sets, including the application level, the network level, and the captured full device state, to be correlated together.
  b. Alternatively, a Cisco ThousandEyes™ network visibility or similar synthetic probe agent may not be available close to the client location involved. In such a case, if the user is located on a controlled and managed enterprise network segment, an SLA path trace may be performed from the network controller. This type of trace gathers and computes data across multiple sources and dimensions to derive the end-to-end network path, and any associated impairments, computationally.

Upon completing the computation of this end-to-end path and associated impairments, trigger probes are sent by the network controller, directly targeted to any/all (designated) network nodes on the network path from which capture of a full device state is desired. The source of the trigger probes would be the network controller, with the destination being the designated network node of interest. The target device (e.g., the designated network node), upon receiving the trigger probe, operates as describe above.

In certain deployment scenarios, there may be a tunnel (e.g., GRE or VPN tunnel) formed between two or more transit nodes on the network path traversed by the trigger probe. The trigger probe metadata would be hidden from any transit nodes that only see the outer tunnel. In such situations, embodiments presented herein include two options by which these transit nodes are made aware of the metadata of the trigger probe:
  a. Copy the entire metadata of the trigger probe to outside of the encapsulation header for the tunnel. All of the information, including the digital signature, is replicated outside of the tunnel header so that all transit nodes that fall in the path of the tunnel can still read the information and perform a full device state capture.
  b. Include an indication in the encapsulation header (GRE, VXLAN-GPE, etc.) that informs any "probe-aware" nodes in the transit path to "peek" under (i.e., examine) the encapsulation headers to find the trigger probe metadata.

In summary, embodiments presented herein provide specially formatted network trigger probes configured to trigger (i) capturing a full device state (by way of a core memory dump) from any designated/particular network nodes along an end-to-end network path, and (ii) exporting, by the designated network nodes, the captured full device state along with a correlation ID copied from the trigger probe and that can be used to associate the trigger probe with the captured full device state. The captured full device state can be used as an aid to determine a root cause of any network or application impairments (also associated to the correlation ID) observed on the network path, and subsequently serve as a basis to guide the remediation of any such issues.

This provides for simplified root cause determination and issue remediation, on-demand, without having to know, a priori, which data is to be gathered from the designated network node because all control and data plane state information is captured.

Figure 8:
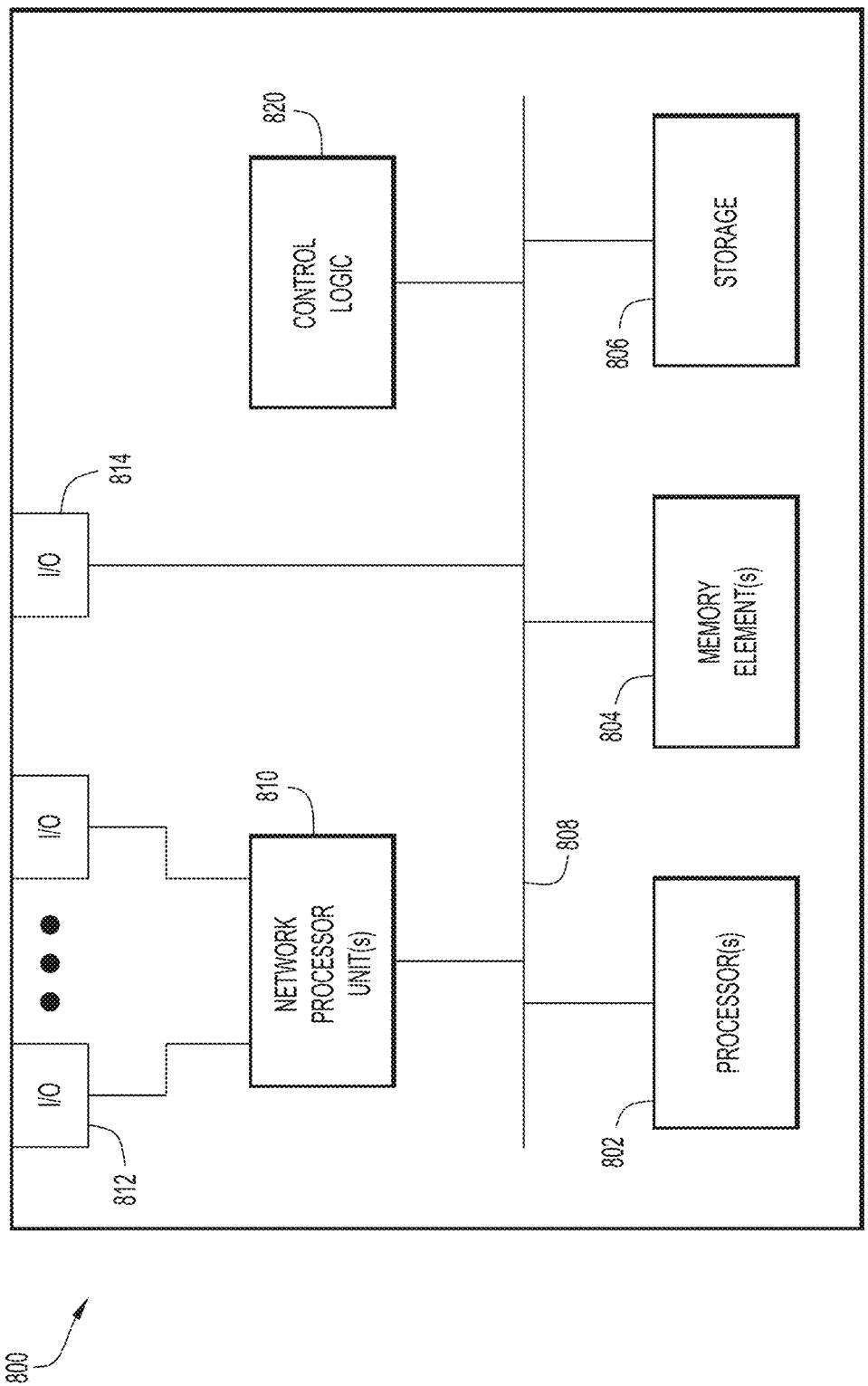
FIG. 8 is a hardware block diagram of a device that may perform functions associated with operations discussed herein, according to an example embodiment.

Referring to FIG. 8, FIG. 8 illustrates a hardware block diagram of a computing device 800 that may perform functions associated with operations discussed herein in connection with the techniques depicted in FIGS. 1-7 In various embodiments, a computing device or apparatus, such as computing device 800 or any combination of computing devices 800, may be configured as any entity/entities as discussed for the techniques depicted in connection with FIGS. 1-7 in order to perform operations of the various techniques discussed herein. For example, computing device 800 may represent management entity 104, including each of network controller 120, collector 122, and data analyzer 124, and may also represent each of network nodes 204(1)-204(6), and analysis framework 700.

In at least one embodiment, the computing device 800 may be any apparatus that may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa) or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to conduct operations in accordance with teachings of the present disclosure.

In some instances, software of the present embodiments may be available via a non-transitory computer useable medium (e.g., magnetic, or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity, and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source, and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. IP addresses discussed herein and in the claims can include any IPv4 and/or IPv6 addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of and' one or more of can be represented using the '(s)' nomenclature (e.g., one or more element(s)).

In summary, in some aspects, the techniques described herein relate to a method including: at a management entity configured to communicate with a network: upon detecting a performance problem on a network path in the network, generating a trigger probe having a correlation identifier that is unique and correlated to the performance problem, the trigger probe configured to transit the network path and, on one or more designated network nodes of the network path, trigger (i) capturing a full device state, including a control plane state and a data plane state, and (ii) exporting a report of the full device state with the correlation identifier; sending the trigger probe along the network path; receiving, from each of the one or more designated network nodes transited by the trigger probe, the report that includes the correlation identifier and the full device state; and correlating each report to the performance problem based on the correlation identifier in each report, to diagnose a root cause of the performance problem using the full device state in each report.

In some aspects, the techniques described herein relate to a method, wherein generating includes generating the trigger probe to include: end-to-end source and destination Internet Protocol (IP) addresses for the network path; a trigger field that includes an IP address for each of the one or more designated network nodes; and an IP address of where to export the report.

In some aspects, the techniques described herein relate to a method, wherein generating further includes generating the trigger probe to include a time-to-live (TTL) one less than a full TTL of the network path, end-to-end.

In some aspects, the techniques described herein relate to a method, wherein generating further includes generating the trigger probe to include a digital signature based on contents of the trigger probe.

In some aspects, the techniques described herein relate to a method, wherein the control plane state and the data plane state include information used by network and link layer communication protocols for routing and forwarding of data packets along the network path.

In some aspects, the techniques described herein relate to a method, wherein the control plane state and the data plane state further include a routing information base (RIB), media access control (MAC) addresses, IP addresses, network node interfaces and corresponding performance counters, and a forwarding information base (FIB).

In some aspects, the techniques described herein relate to a method, wherein the control plane state and the data plane state further include indicators for whether a protocol tunnel is present and, when the protocol tunnel is present, a type of the protocol tunnel, and encapsulation attributes for the protocol tunnel.

In some aspects, the techniques described herein relate to a method, further including, after correlating: instantiating virtual instances of packet routing and forwarding configurations of the one or more designated network nodes based on each full device state; and troubleshooting the performance problem using the virtual instances.

In some aspects, the techniques described herein relate to a method, further including: monitoring performance of the network path against an acceptable performance profile; and based on monitoring, detecting an out-of-profile condition as the performance problem.

In some aspects, the techniques described herein relate to a method, wherein the trigger probe includes identifiers of each of the one or more designated network nodes, and the method further includes, at a designated network node of the one or more designated network nodes: receiving the trigger probe; upon determining that an IP address of the designated network node matches one of the identifiers, copying full device state information to a report, and exporting the report to the management entity; and forwarding the trigger probe to a next hop of the network path.

In some aspects, the techniques described herein relate to an apparatus including: one or more network input/output interfaces to communicate with a network; and a processor coupled to the one or more network input/output interfaces and configured to perform: upon detecting a performance problem on a network path in the network, generating a trigger probe having a correlation identifier that is unique and correlated to the performance problem, the trigger probe configured to transit the network path and, on one or more designated network nodes of the network path, trigger (i) capturing a full device state, including a control plane state and a data plane state, and (ii) exporting a report of the full device state with the correlation identifier; sending the trigger probe along the network path; receiving, from each of the one or more designated network nodes transited by the trigger probe, the report that includes the correlation identifier and the full device state; and correlating each report to the performance problem based on the correlation identifier in each report, to diagnose a root cause of the performance problem using the full device state in each report.

In some aspects, the techniques described herein relate to an apparatus, wherein the trigger probe includes: end-to-end source and destination Internet Protocol (IP) addresses for the network path; a trigger field that includes an IP address for each of the one or more designated network nodes; and an IP address of where to export the report.

In some aspects, the techniques described herein relate to an apparatus, wherein the control plane state and the data plane state include information used by network and link layer communication protocols for routing and forwarding of data packets along the network path.

In some aspects, the techniques described herein relate to an apparatus, wherein the control plane state and the data plane state further include a routing information base (RIB), media access control (MAC) addresses, IP addresses, network node interfaces and corresponding performance counters, and a forwarding information base (FIB).

In some aspects, the techniques described herein relate to an apparatus, wherein the processor is further configured to perform, after correlating: instantiating virtual instances of packet routing and forwarding configurations of the one or more designated network nodes based on each full device state; and troubleshooting the performance problem using the virtual instances.

In some aspects, the techniques described herein relate to an apparatus, wherein the processor is further configured to perform: monitoring performance of the network path against an acceptable performance profile; and based on monitoring, detecting an out-of-profile condition as the performance problem.

In some aspects, the techniques described herein relate to a non-transitory computer readable medium encoded with instructions that, when executed by a processor, cause the processor to perform: upon detecting a performance problem on a network path in a network, generating a trigger probe having a correlation identifier that is unique and correlated to the performance problem, the trigger probe configured to transit the network path and, on one or more designated network nodes of the network path, trigger (i) capturing a full device state, including a control plane state and a data plane state, and (ii) exporting a report of the full device state with the correlation identifier; sending the trigger probe along the network path; receiving, from each of the one or more designated network nodes transited by the trigger probe, the report that includes the correlation identifier and the full device state; and correlating each report to the performance problem based on the correlation identifier in each report, to diagnose a root cause of the performance problem using the full device state in each report.

In some aspects, the techniques described herein relate to a non-transitory computer readable medium, wherein the instructions to cause the processor to perform generating include instructions to cause the processor to perform generating the trigger probe to include: end-to-end source and destination Internet Protocol (IP) addresses for the network path; a trigger field that includes an IP address for each of the one or more designated network nodes; and an IP address of where to export the report.

In some aspects, the techniques described herein relate to a non-transitory computer readable medium, wherein the control plane state and the data plane state include information used by network and link layer communication protocols for routing and forwarding of data packets along the network path.

In some aspects, the techniques described herein relate to a non-transitory computer readable medium, wherein the control plane state and the data plane state further include a routing information base (RIB), media access control (MAC) addresses, IP addresses, network node interfaces and corresponding performance counters, and a forwarding information base (FIB).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   at a management entity configured to communicate with a network:
   upon detecting a performance problem on a network path in the network, generating a trigger probe having a correlation identifier that is unique and correlated to the performance problem, the trigger probe configured to transit the network path and, when transiting one or more designated network nodes of the network path, trigger (i) capturing a full device state, including a control plane state and a data plane state, and (ii) exporting a report of the full device state with the correlation identifier;
   sending the trigger probe along the network path;
   receiving, from each of the one or more designated network nodes transited by the trigger probe, the report that includes the correlation identifier and the full device state; and
   correlating each report to the performance problem based on the correlation identifier in each report, to diagnose a root cause of the performance problem using the full device state in each report.

2. The method of claim 1, wherein the generating includes generating the trigger probe to include:
   end-to-end source and destination Internet Protocol (IP) addresses for the network path;
   a trigger field that includes an IP address for each of the one or more designated network nodes; and
   an IP address of where to export the report.

3. The method of claim 2, wherein the generating further includes generating the trigger probe to include a time-to-live (TTL) one less than a full TTL of the network path, end-to-end.

4. The method of claim 2, wherein the generating further includes generating the trigger probe to include a digital signature based on contents of the trigger probe.

5. The method of claim 1, wherein the control plane state and the data plane state include information used by network and link layer communication protocols for routing and forwarding of data packets along the network path.

6. The method of claim 5, wherein the control plane state and the data plane state further include a routing information base (RIB), media access control (MAC) addresses, IP addresses, network node interfaces and corresponding performance counters, and a forwarding information base (FIB).

7. The method of claim 5, wherein the control plane state and the data plane state further include indicators for whether a protocol tunnel is present and, when the protocol tunnel is present, a type of the protocol tunnel, and encapsulation attributes for the protocol tunnel.

8. The method of claim 1, further comprising, after correlating:
   instantiating virtual instances of packet routing and forwarding configurations of the one or more designated network nodes based on each full device state; and
   troubleshooting the performance problem using the virtual instances.

9. The method of claim 1, further comprising:
   monitoring performance of the network path against an acceptable performance profile; and
   based on monitoring, detecting an out-of-profile condition as the performance problem.

10. The method of claim 1, wherein the trigger probe includes identifiers of each of the one or more designated network nodes, and the method further comprises, at a designated network node of the one or more designated network nodes:
    receiving the trigger probe;
    upon determining that an IP address of the designated network node matches one of the identifiers, copying full device state information that includes the full device state of the designated network node to a report, and exporting the report to the management entity; and
    forwarding the trigger probe to a next hop of the network path.

11. An apparatus comprising:
    one or more network input/output interfaces to communicate with a network; and
    a hardware processor coupled to the one or more network input/output interfaces and configured to perform:
    upon detecting a performance problem on a network path in the network, generating a trigger probe having a correlation identifier that is unique and correlated to the performance problem, the trigger probe configured to transit the network path and, when transiting one or more designated network nodes of the network path, trigger (i) capturing a full device state, including a control plane state and a data plane state, and (ii) exporting a report of the full device state with the correlation identifier;
    sending the trigger probe along the network path;
    receiving, from each of the one or more designated network nodes transited by the trigger probe, the report that includes the correlation identifier and the full device state; and
    correlating each report to the performance problem based on the correlation identifier in each report, to diagnose a root cause of the performance problem using the full device state in each report.

12. The apparatus of claim 11, wherein the trigger probe includes:
- end-to-end source and destination Internet Protocol (IP) addresses for the network path;
- a trigger field that includes an IP address for each of the one or more designated network nodes; and
- an IP address of where to export the report.

13. The apparatus of claim 11, wherein the control plane state and the data plane state include information used by network and link layer communication protocols for routing and forwarding of data packets along the network path.

14. The apparatus of claim 13, wherein the control plane state and the data plane state further include a routing information base (RIB), media access control (MAC) addresses, IP addresses, network node interfaces and corresponding performance counters, and a forwarding information base (FIB).

15. The apparatus of claim 11, wherein the hardware processor is further configured to perform, after correlating:
- instantiating virtual instances of packet routing and forwarding configurations of the one or more designated network nodes based on each full device state; and
- troubleshooting the performance problem using the virtual instances.

16. The apparatus of claim 11, wherein the hardware processor is further configured to perform:
- monitoring performance of the network path against an acceptable performance profile; and
- based on monitoring, detecting an out-of-profile condition as the performance problem.

17. A non-transitory computer readable medium encoded with instructions that, when executed by a processor, cause the processor to perform:
- upon detecting a performance problem on a network path in a network, generating a trigger probe having a correlation identifier that is unique and correlated to the performance problem, the trigger probe configured to transit the network path and, when transiting one or more designated network nodes of the network path, trigger (i) capturing a full device state, including a control plane state and a data plane state, and (ii) exporting a report of the full device state with the correlation identifier;
- sending the trigger probe along the network path;
- receiving, from each of the one or more designated network nodes transited by the trigger probe, the report that includes the correlation identifier and the full device state; and
- correlating each report to the performance problem based on the correlation identifier in each report, to diagnose a root cause of the performance problem using the full device state in each report.

18. The non-transitory computer readable medium of claim 17, wherein the instructions to cause the processor to perform the generating include instructions to cause the processor to perform generating the trigger probe to include:
- end-to-end source and destination Internet Protocol (IP) addresses for the network path;
- a trigger field that includes an IP address for each of the one or more designated network nodes; and
- an IP address of where to export the report.

19. The non-transitory computer readable medium of claim 17, wherein the control plane state and the data plane state include information used by network and link layer communication protocols for routing and forwarding of data packets along the network path.

20. The non-transitory computer readable medium of claim 19, wherein the control plane state and the data plane state further include a routing information base (RIB), media access control (MAC) addresses, IP addresses, network node interfaces and corresponding performance counters, and a forwarding information base (FIB).

* * * * *